(12) United States Patent
Han et al.

(10) Patent No.: US 11,600,820 B2
(45) Date of Patent: Mar. 7, 2023

(54) HIGH VOLTAGE POSITIVE ELECTRODE ACTIVE MATERIAL INCLUDING LITHIUM MANGANESE-BASED OXIDE AND METHOD FOR PRODUCING THE SAME

(71) Applicant: LG Chem, Ltd., Seoul (KR)

(72) Inventors: Gi Beom Han, Daejeon (KR); Jintae Hwang, Daejeon (KR); Wang Mo Jung, Daejeon (KR); Min Kyu You, Daejeon (KR); Chi Ho Jo, Daejeon (KR); Sungbin Park, Daejeon (KR); Inseong Ju, Daejeon (KR); Hyuck Hur, Daejeon (KR); Younguk Park, Daejeon (KR); Tae Gu Yoo, Daejeon (KR)

(73) Assignee: LG Energy Solution, Ltd.

( * ) Notice: Subject to any disclaimer, the term of this patent is extended or adjusted under 35 U.S.C. 154(b) by 199 days.

(21) Appl. No.: 16/494,503

(22) PCT Filed: Sep. 7, 2018

(86) PCT No.: PCT/KR2018/010473
§ 371 (c)(1),
(2) Date: Sep. 16, 2019

(87) PCT Pub. No.: WO2019/066298
PCT Pub. Date: Apr. 4, 2019

(65) Prior Publication Data
US 2020/0020942 A1 Jan. 16, 2020

(30) Foreign Application Priority Data

Sep. 26, 2017 (KR) .......................... 10-2017-0124381
Aug. 6, 2018 (KR) .......................... 10-2018-0091426

(51) Int. Cl.
*H01M 4/505* (2010.01)
*H01M 4/36* (2006.01)
(Continued)

(52) U.S. Cl.
CPC .......... *H01M 4/505* (2013.01); *H01M 4/362* (2013.01); *H01M 4/525* (2013.01); *H01M 4/62* (2013.01);
(Continued)

(58) Field of Classification Search
CPC ........ H01M 2300/0065–0097; H01M 10/0562
See application file for complete search history.

(56) References Cited

U.S. PATENT DOCUMENTS 8,906,553 B1 12/2014 Hagh et al.
9,929,430 B2 3/2018 Iwasaki et al.
(Continued)

FOREIGN PATENT DOCUMENTS

CN 101076914 A 11/2007
CN 107195859 A 9/2017
(Continued)

OTHER PUBLICATIONS

Machine translation of JP2009-295523A (Year: 2009).*
(Continued)

*Primary Examiner* — Ryan S Cannon
(74) *Attorney, Agent, or Firm* — Lerner, David, Littenberg, Krumholz & Mentlik, LLP

(57) ABSTRACT

A positive electrode active material contains a lithium-rich lithium manganese-based oxide, wherein the lithium manganese-based oxide has a composition of the following chemical formula (1), and wherein a lithium ion conductive glass-ceramic solid electrolyte layer containing at least one selected from the group consisting of thio-LISICON(thio-lithium super ionic conductor), LISICON(lithium super
(Continued)

ionic conductor), $Li_2S$—$SiS_2$—$Li_4SiO_4$, and $Li_2S$—$SiS_2$—$P_2S_5$—$LiI$ is formed on the surface of the lithium manganese-based oxide particle:

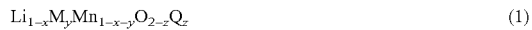

$$Li_{1-x}M_yMn_{1-x-y}O_{2-z}Q_z \qquad (1)$$

wherein, $0<x\leq0.2$, $0<y\leq0.2$, and $0\leq z\leq0.5$;

M is at least one element selected from the group consisting of Al, Mg, Ni, Co, Fe, Cr, V, Ti, Cu, B, Ca, Ga, In, Ru, Zn, Zr, Nb, Sn, Mo, Sr, Sb, W, Ti and Bi; and Q is at least one element selected from the group consisting of P, N, F, S and Cl.

15 Claims, 2 Drawing Sheets

(51) Int. Cl.
*H01M 4/525* (2010.01)
*H01M 4/62* (2006.01)
*H01M 10/0525* (2010.01)
*H01M 10/0562* (2010.01)
*H01M 4/02* (2006.01)

(52) U.S. Cl.
CPC ... *H01M 10/0525* (2013.01); *H01M 10/0562* (2013.01); *H01M 2004/028* (2013.01); *H01M 2300/0071* (2013.01)

(56) References Cited

U.S. PATENT DOCUMENTS

| | | | |
|---|---|---|---|
| 9,972,841 | B2 | 5/2018 | Kwak et al. |
| 10,109,851 | B2 | 10/2018 | Song et al. |
| 10,177,381 | B2 | 1/2019 | Fanous et al. |
| 10,199,649 | B2 | 2/2019 | Beck et al. |
| 10,217,997 | B2 | 2/2019 | Hah et al. |
| 2012/0302691 | A1 | 11/2012 | Jong et al. |
| 2013/0266842 | A1* | 10/2013 | Woehrle ............... C04B 35/01 429/188 |
| 2014/0287324 | A1* | 9/2014 | Tsuchida ............ H01M 10/052 429/304 |
| 2015/0096169 | A1* | 4/2015 | Hasegawa ............ H01M 4/525 29/623.5 |
| 2015/0147655 | A1* | 5/2015 | Park ...................... H01M 4/582 429/231.1 |
| 2015/0221978 | A1* | 8/2015 | Murota ................. H01M 4/505 429/320 |
| 2015/0228970 | A1 | 8/2015 | Song et al. |
| 2015/0325854 | A1* | 11/2015 | Kim .................... H01M 4/1391 429/231.1 |
| 2015/0372344 | A1* | 12/2015 | Iwasaki ................ H01M 4/362 429/304 |
| 2018/0301741 | A1* | 10/2018 | Kumar ................. H01M 4/622 |

FOREIGN PATENT DOCUMENTS

| | | | |
|---|---|---|---|
| JP | 2003059492 | A | 2/2003 |
| JP | 2009295523 | A * | 12/2009 |
| JP | 2012185911 | A | 9/2012 |
| JP | 2012246482 | A | 12/2012 |
| JP | 2013127945 | A | 6/2013 |
| JP | 5286516 | B2 | 9/2013 |
| JP | 2014041720 | A | 3/2014 |
| JP | 2015130273 | A | 7/2015 |
| JP | 2015201372 | A | 11/2015 |
| KR | 20150059462 | A | 6/2015 |
| KR | 20150084337 | A | 7/2015 |
| KR | 20150094095 | A | 8/2015 |
| KR | 20150103741 | A | 9/2015 |
| KR | 20150108761 | A | 9/2015 |
| KR | 101578510 | B1 | 12/2015 |
| KR | 20160038789 | A | 4/2016 |
| KR | 20160143577 | A | 12/2016 |
| KR | 20170015634 | A | 2/2017 |
| KR | 20170069071 | A | 6/2017 |
| KR | 20170071236 | A | 6/2017 |
| KR | 20170100534 | A | 9/2017 |
| WO | 2016175554 | A1 | 11/2016 |

OTHER PUBLICATIONS

C. J. Leo, et al., "Lithium conducting glass ceramic with Nasicon structure", Materials Research Bulletin 37, p. 1419-1430 (Year: 2002).*

X. Xu, et al., "Preparation and electrical properties of NASICON-type structured Li1.4Al1.6(PO4)3 glass-ceramics by the citric acid-assisted sol-gel method", Solid State Ionics 178, p. 29-34 (Year: 2007).*

Y. Deng et al., "Enhancing the Lithium ion conductivity in Lithium superionic conductor (LISICON) solid electrolytes through a mixed polyanion effect", Applied Materials & Interfaces 9, p. 7050-7058 (Year: 2017).*

Extended European Search Report including Written Opinion for EP18862146.0 dated Jan. 10, 2020.

International Search Report for Application No. PCT/KR2018/010473, dated Mar. 13, 2019, pp. 1-2.

Knauth, Inorganic solid Li ion Conductors: An overview, Solid State Ionics, accepted Mar. 2009, pp. 911-916, vol. 180, Elsevier B.V.

Jetybayeva, A. et al., "Recent advancements in solid electrolytes integrated into all-solid-state 2D and 3D lithium-ion microbatteries" Journal of Materials Chemistry A, Jul. 2021, pp. 15140-15178, vol. 9, The Royal Society of Chemistry.

Search Report for Chinese Appl. No. 201880016062.8 dated Nov. 17, 2021. 2 pgs.

* cited by examiner

[FIG. 1]
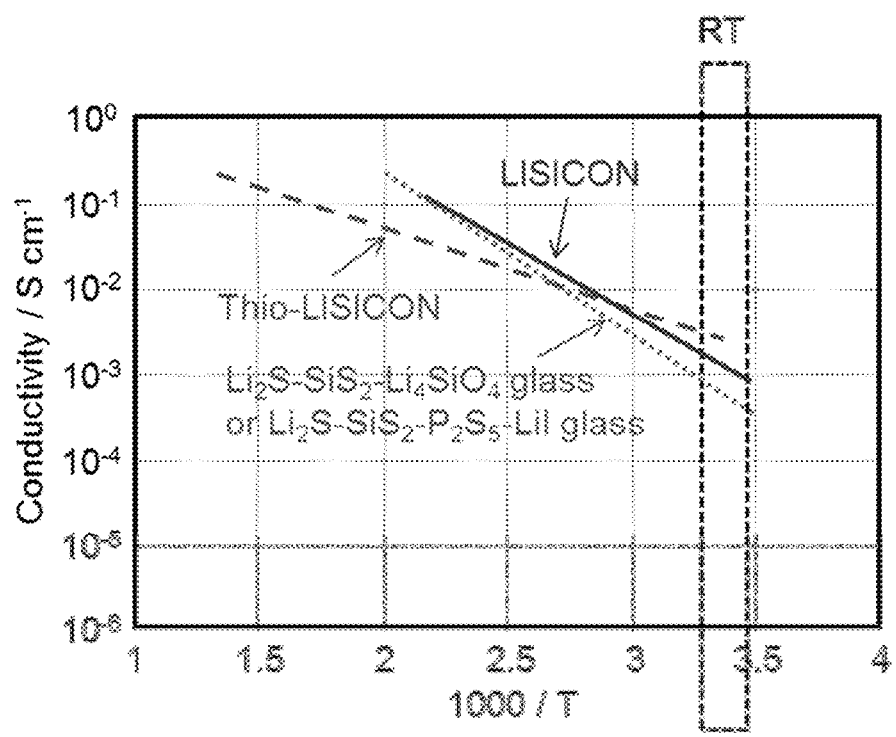

[FIG. 2]
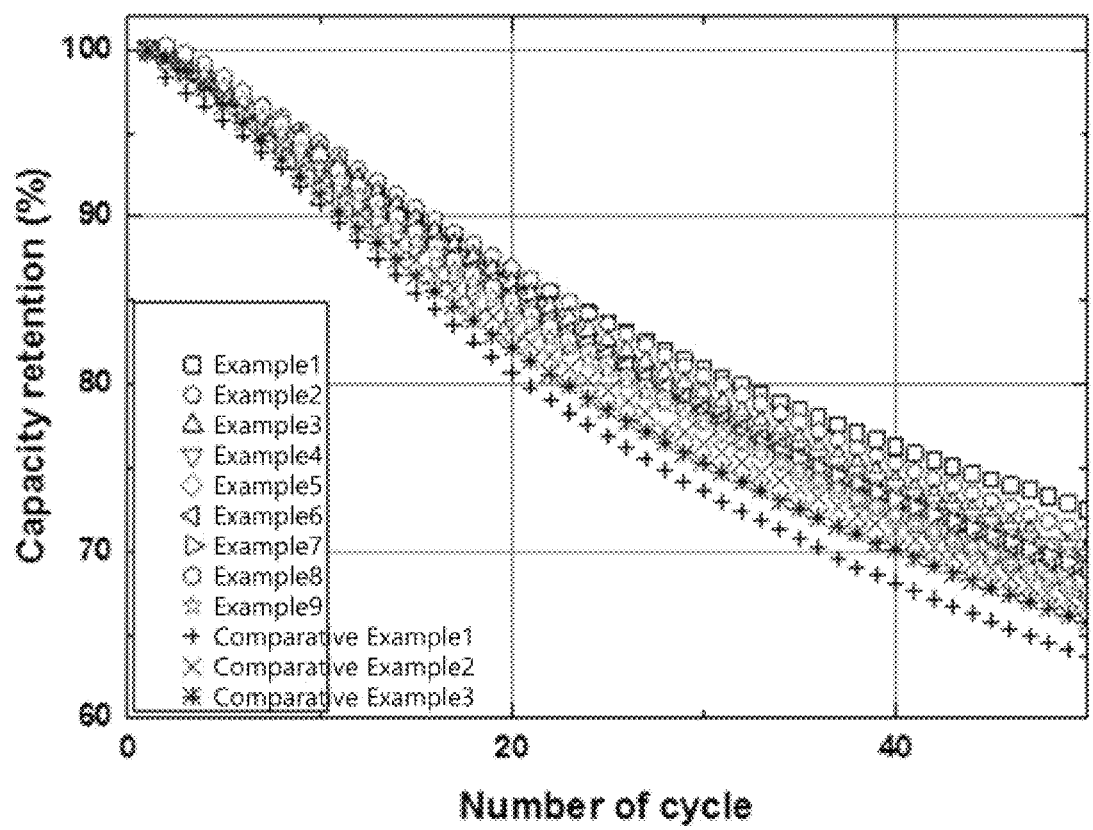

HIGH VOLTAGE POSITIVE ELECTRODE ACTIVE MATERIAL INCLUDING LITHIUM MANGANESE-BASED OXIDE AND METHOD FOR PRODUCING THE SAME

CROSS-REFERENCE TO RELATED APPLICATION(S)

This application is a national phase entry under 35 U.S.C. § 371 of International Application No. PCT/KR2018/010473, filed Sep. 7, 2018, which claims the benefit of Korean Patent Application No. 10-2017-0124381, filed Sep. 26, 2017, and Korean Patent Application No. 10-2018-0091426, filed Aug. 6, 2018 the entire contents of which are incorporated herein by reference.

TECHNICAL FIELD

BACKGROUND ART

In accordance with technological development and increased demand for mobile devices, demand for using secondary batteries as energy sources has rapidly increased. Among these secondary batteries, lithium secondary batteries having high energy density and operating potential, long cycle life, and low self-discharge ratio are commercially available and widely used.

Also, in line with growing concerns about environmental issues, a great deal of research associated with electric vehicles and hybrid electric vehicles which are capable of substituting for vehicles using fossil fuels such as gasoline vehicles and diesel vehicles, which are one of major causes of air pollution, have been conducted. Although nickel-metal hydride secondary batteries have mainly been used as power sources for such electric vehicles and hybrid electric vehicles, a great deal of research has also been carried out into lithium secondary batteries having high energy density, high discharge voltage, long cycle life, and low self-discharge rate, and some of the lithium secondary batteries are commercially available.

Carbon materials are mainly used for a negative electrode active material of these lithium secondary batteries, and the use of lithium metal, sulfur compounds and the like are also under consideration. Moreover, lithium-containing cobalt oxide ($LiCoO_2$) is mainly used for a positive electrode active material and, in addition, the uses of lithium-containing manganese oxides, such as $LiMnO_2$ having a layered crystal structure and $LiMn_2O_4$ having a spinel crystal structure, and lithium-containing nickel oxides ($LiNiO_2$) are also under consideration.

Among the above-mentioned positive electrode active materials, $LiCoO_2$ is most commonly used due to its excellent lifetime characteristics and high charge-discharge efficiency, but has low structural stability. In addition, due to the resource limitations of cobalt, which is a raw material, $LiCoO_2$ is expensive, and therefore price competitiveness is low, whereby the massive use thereof as power sources in fields such as electric vehicles is limited.

$LiNiO_2$ based positive electrode active materials are relatively inexpensive, and makes it possible for a battery to have high discharge capacity, However, phase transition abruptly occurs in the crystal structure depending on the change in volume of the battery caused by charge-discharge cycle. In addition, when $LiNiO_2$ is exposed to air and moisture, the safety of $LiNiO_2$ is abruptly lowered.

In addition, lithium manganese oxides such as $LiMnO_2$, $LiMn_2O_4$, etc. have merits of excellent thermal safety and low price but entail disadvantages such as low capacity, poor cycle life characteristics, poor high-temperature characteristics, etc.

In this regard, for a lithium transition metal oxide containing a high content of Mn, an attempt has been made to use an oxide containing excessive lithium wherein the content of lithium is higher than the content of the transition metal such that a high capacity of 270 or more mAh/g is exhibited at a high voltage of 4.5 V or higher.

However, the oxide containing excessive lithium has a high irreversible capacity. Furthermore, in addition to lithium, oxygen escapes from the active material structure at the time of high-voltage activation to utilize excessive lithium. As a result, it has been found that the active material structure may collapse, a voltage sagging phenomenon resulting therefrom may occur, the deterioration of the battery cell may be accelerated, an increase of the resistance and generation of gas and the like may be caused due to decomposition of the electrolyte according to high-voltage driving, thereby further accelerating deterioration of the battery cell.

However, since high-voltage driving is essential for high energy density, conventionally, attempts have been made to coat a metal oxide onto the surface of such a positive electrode active material to improve the safety of high voltage through i) control of residual moisture, ii) removal of lithium impurities on the surface of the active materials, and iii) enhancement of surface stability. However, the above-mentioned techniques have limitations in continuously raising the operating voltage for ever-increasing need.

Therefore, even when using a voltage of higher than 4.6 V, which is much higher than the conventional operating voltage, positive electrode active material technologies capable of exhibiting high surface stability while exhibiting excellent battery cell performance are highly required.

DETAILED DESCRIPTION OF THE INVENTION

Technical Problem

The present invention has been made to solve the problems of conventional techniques and other technical problems that have yet to be resolved.

As a result of a variety of extensive and intensive studies and experiments to solve the problems described above, the present inventors have found that when a positive electrode active material in which a solid electrolyte layer having a specific composition is formed on the surface of lithium-rich lithium manganese-based oxide particles is used, the positive electrode active material can exhibit excellent surface stability even in a high operating voltage range and have an increased conductivity to thereby improve the overall performance of the battery cell. The present invention has been completed based on these findings.

Technical Solution

Therefore, the positive electrode active material of the present invention is a positive electrode active material containing lithium-rich lithium manganese-based oxide, wherein the lithium manganese-based oxide has a composition of the following chemical formula (1), and wherein a lithium ion conductive glass-ceramic solid electrolyte layer containing at least one selected from the group consisting of thio-LISICON(thio-lithium super ionic conductor), LISICON(lithium super ionic conductor), Li$_2$S—SiS$_2$—Li$_4$SiO$_4$, and Li$_2$S—SiS$_2$—P$_2$S$_5$—LiI is formed on the surface of the lithium manganese-based oxide particle.

$$Li_{1+x}M_yMn_{1-x-y}O_{2-z}Q_z \quad (1)$$

wherein, 0<x≤0.2, 0<y≤0.2, and 0≤z≤0.5;

M is at least one element selected from the group consisting of Al, Mg, Ni, Co, Fe, Cr, V, Ti, Cu, B, Ca, Ga, In, Ru, Zn, Zr, Nb, Sn, Mo, Sr, Sb, W, Ti and Bi; and Q is at least one element selected from the group consisting of P, N, F, S and Cl. Specifically, the M may essentially include Ni and Co, and optionally, it may further include at least one element selected from Al, Zr, Zn, Ti, Mg, Ga, In, Ru, Nb and Sn.

More specifically, the lithium manganese-based oxide may have a composition of the following chemical formula (2).

$$Li_{1+x}Ni_aCo_bMn_{1-x-a-b}O_2 \quad (2)$$

wherein, 0<x≤0.2, 0≤a≤0.2, 0≤b≤0.2, and 0<a+b≤0.2.

As described above, the lithium-rich lithium manganese-based oxide is a high-capacity positive electrode material that can be used at a high voltage as compared with a conventional lithium cobalt oxide or lithium nickel manganese cobalt oxide.

However, such a lithium-rich lithium manganese-based oxide involves problems such as the decrease of surface stability due to use at high voltage, and an increase in resistance and generation of gas through decomposition of the electrolyte. Thus, the present inventors have conducted extensive and intensive researches, and have found that when the solid electrolyte having the same degree of ion conductivity as the liquid electrolyte is coated onto the surface of the lithium manganese-based oxide, by suppressing direct contact between the positive electrode active material and the electrolyte in a battery system using a liquid electrolyte, the problem caused by the decomposition of the electrolyte can be solved and simultaneously, the surface layer can also maintain high ionic conductivity, whereby as ion conduction between the lithium manganese-based oxide and the liquid electrolyte as the positive electrode active material is facilitated, the performance of the battery cell is improved.

Moreover, in the case of conventional surface coating, as a lithium compound is formed through reaction with a lithium by-product generated in the production of a positive electrode active material and used as a protective layer, there is a limit that the composition and amount of the protective layer are limited depending on the amount of the lithium by-products on the surface of the active material, whereas unlike this, the present invention can not only be introduced into the surface coating layer without removal of lithium by-products, but also if desired, it may be possible to adjust the reactants during the formation of the coating layer to remove lithium by-products to a desired extent, and thus, the active material having excellent performance can be produced according to the purpose of use.

The solid electrolyte layer according to the present invention for exhibiting these effects is more advantageous when the material is more excellent in lithium ion conductivity. Specifically, referring to FIG. 1, among various lithium ion conductive glass-ceramic solid electrolytes, a solid electrolyte having ion conductivity similar to that of a liquid electrolyte at room temperature may be at least one selected from the group consisting of thio-LISICON(thio-lithium super ionic conductor), LISICON(lithium super ionic conductor), Li$_2$S—SiS$_2$—Li$_4$SiO$_4$, and Li$_2$S—SiS$_2$—P$_2$S$_5$—LiI.

Here, "glass-ceramic" means a material which consists of an amorphous solid and crystalline and is obtained by heating a glass and thereby causing a crystal phase to precipitate in a glass phase of the glass.

More specifically, the solid electrolyte layer may include LISICON of Li$_{1+x+y}$(Al, Ga)$_x$(Ti, Ge)$_{2-x}$Si$_y$P$_{3-y}$O$_{12}$ (wherein, 0≤x≤1, and 0≤y≤1), and it may be composed of only these materials. Alternatively, the solid electrolyte layer may include thio-LISICON of Li$_{1+x+y}$(Al, Ga)$_x$(Ti, Ge)$_{2-x}$Si$_y$P$_{3-y}$S$_{12}$ (wherein, 0≤x≤1, and 0≤y≤1), and it may be composed of only these materials.

The ionic conductivity of the solid electrolyte layer having such a composition has an ionic conductivity similar to that of the liquid electrolyte used in the past, and it may be 1×10$^{-4}$ S·cm$^{-1}$ or more at room temperature, and more specifically, it may be 1×10$^{-2}$ S·cm$^{-1}$ to 1×10$^{-3}$ S·cm$^{-1}$.

Here, the room temperature means a temperature of 24 to 26 degrees Celsius.

The content of the solid electrolyte layer may be 0.1 to 10% by weight, particularly 1 to 8% by weight, and more particularly 3 to 8% by weight, based on a total weight of the lithium manganese-based oxide.

When the content of the solid electrolyte layer is out of the above range and is smaller than 0.1% by weight, it is not possible to ensure the surface stability during high voltage driving to be exerted by the coating of the solid electrolyte layer. When the content of the solid electrolyte layer is more than 10% by weight, rather, the solid electrolyte layer can act as a resistance, and thus, a decrease in capacity and a decrease in rate characteristics due to an increase in resistance may occur, which is not preferable.

On the other hand, the solid electrolyte layer may further include a conductive agent for further improving the electron conductivity. At this time, as the conductive agent, Ketjen black, acetylene black, graphite, metal powder, metal-coated plastic powder, and metal-coated glass powder may be used.

The positive electrode active material according to the present invention can be produced, for example, by the following method.

In one embodiment, a positive electrode active material can be produced by a method comprising the steps of:

(a) mixing a lithium-rich lithium manganese-based oxide powder and a lithium ion conductive glass-ceramic solid electrolyte powder containing at least one selected from the group consisting of thio-LISICON(thio-lithium super ionic conductor), LISICON(lithium super ionic conductor), Li$_2$S—SiS$_2$—Li$_4$SiO$_4$, and Li$_2$S—SiS$_2$—P$_2$S$_5$—LiI; and (b) heat-treating the mixture prepared in step (a).

That is, a lithium-rich lithium manganese-based oxide powder is prepared, to which a lithium ion conductive glass-ceramic solid electrolyte powder is mixed and dry-coated, and the lithium ion conductive glass-ceramic solid electrolyte powder is brought into contact with and attached to the surface of the lithium manganese-based oxide powder, and these are heat-treated, the lithium ion conductive glass-ceramic solid electrolyte powders are bonded to each other after being softened or melted, thereby firmly coating onto the surface of the lithium manganese-based oxide powder.

The dry coating can be performed, for example, by a ball mill.

In this case, as described above, the lithium ion conductive glass-ceramic solid electrolyte layer can be formed without being greatly limited by the amount of lithium by-products that may be present in the lithium manganese-based oxide powder.

According to the above production method, the mixing ratio of the lithium-rich lithium manganese-based oxide powder and the lithium ion conductive glass-ceramics solid electrolyte powder may be 0.1 to 10% by weight based on the total weight of the lithium-rich lithium manganese-based oxide powder.

The reasons for such mixing ratio are as described above.

The particle size ratio between the lithium-rich lithium manganese-based oxide powder and the lithium ion conductive glass-ceramic solid electrolyte powder may be 10:1 to 500:1.

When the lithium manganese-based oxide powder is too large beyond the above range, the lithium ion conductive glass-ceramic solid electrolyte powder may not uniformly coat the surface of the lithium manganese-based oxide powder, which is not preferable.

The heat treatment may be performed at 300 to 800 degrees Celsius.

When the heat treatment is performed at a very low temperature beyond the above range, the lithium ion conductive glass-ceramic solid electrolyte powders may not be completely melt-bonded to each other, and thus, the solid electrolyte layer may not be firmly coated onto the lithium manganese-based oxide particle. When the heat treatment is performed at a very high temperature beyond 800 degrees, the structure of the lithium manganese-based oxide active material itself may be changed, which is not preferable.

In another embodiment, the positive electrode active material may be produced by a method comprising the steps of:

(i) mixing a lithium-rich lithium manganese-based oxide powder and a solid electrolyte precursor; and (ii) heat-treating the mixture prepared in step (i).

That is, a lithium-rich lithium manganese-based oxide powder is prepared, to which a precursor capable of forming a solid electrolyte layer is mixed and dry-coated, and these are heat-treated to react the solid electrolyte precursor, whereby through the crystallization step of the precursor, a solid electrolyte layer composed of a lithium ion conductive glass-ceramic solid electrolyte may be formed on the surface of the lithium manganese based oxide powder.

The dry coating may also be performed, for example, by a ball mill.

Here, a lithium compound generated during the production process of the lithium manganese-based oxide may be present on the surface of the lithium-rich lithium manganese-based oxide powder. For example, the lithium compound may be at least one selected from the group consisting of LiOH, $Li_2CO_3$, and $Li_3PO_4$.

Therefore, in order to contain or remove the lithium compound on the surface of the lithium manganese-based oxide to a desired degree, it is possible to remove a lithium compound, that is, lithium by-product, to a desired degree by controlling the type and content of the solid electrolyte precursor to be added at the time of formation of the solid electrolyte layer.

The solid electrolyte precursor is a material for forming the lithium ion conductive glass-ceramic solid electrolyte layer, and for example, it may be an inorganic material including at least one selected from the group consisting of $Li_2O$, $Al_2O_3$, $Ga_2O$, $Ga_2O_3$, $SiO_2$, $P_2O_5$, $TiO_2$ and $GeO_2$; or at least one selected from the group consisting of $Li_2S$, $Al_2S_3$, $GaS$ or $Ga_2S_3$, $SiS_2$, $P_2S_5$, $TiS$ and $GeS_2$.

The solid electrolyte precursor can be appropriately selected in consideration of the composition of the lithium ion conductive glass-ceramic solid electrolyte layer to be formed. For example, a compound of $Li_{1+x+y}Al_xTi_{2-x}Si_yP_{3-y}O_{12}$ (wherein, $0 \leq x \leq 1$, and $0 \leq y \leq 1$) can be obtained by heat-treating and crystallizing an inorganic material precursor of a combination of $Li_2O$—$Al_2O_3$—$TiO_2$—$SiO_2$—$P_2O_5$, and a compound of $Li_{1+x+y}Al_xTi_{2-x}Si_yP_{3-y}S_{12}$ (wherein, $0 \leq x \leq 1$, and $0 \leq y \leq 1$) can be obtained by heat-treating and crystallizing an inorganic material precursor of a combination of $Li_2S$—$Al_2S_3$—$TiS$—$SiS_2$—$P_2S_5$.

In this case, the compound such as $Li_2O$ or $Li_2S$ may not be contained in the solid electrolyte precursor or may be contained in a predetermined amount in consideration of the content of the lithium compound on the surface of the lithium manganese-based oxide.

The mixing ratio of the compounds constituting the precursor can be determined finally by the composition of the desired solid electrolyte layer, and is not limited, but for example, 12 to 18 mol % of $Li_2O$ or $Li_2S$, 5 to 10 mol % of ($Al_2O_3$+ $Ga_2O_3$ or $Ga_2O$) or ($Al_2S_3$+ $Ga_2S_3$ or $GaS$), 35 to 45 mol % of ($TiO_2$+ $GeO_2$) or ($TiS$+ $GeS_2$), 1 to 10 mol % of $SiO_2$ or $SiS_2$, and 30 to 40 mol % of $P_2O_5$ or $P_2S_5$ may be included.

$Li_2O$ or $Li_2S$ is an essential component for providing $Li^+$ ion carrier to impart lithium ion conductivity to the solid electrolyte layer. In order for the solid electrolyte layer to have excellent ion conductivity, the minimum content of the $Li_2O$ or $Li_2S$ component is preferably 12%. Specifically, the minimum content of the above components is 13%, and more specifically 14%. The maximum content of the $Li_2O$ or $Li_2S$ component is preferably 18%, specifically 17%, and more specifically 16%. However, as described above, when a lithium compound is present on the surface of the lithium manganese oxide, taking these into consideration, the content of $Li_2O$ or $Li_2S$ can be reduced by the amount necessary to use the lithium compound on the surface of the lithium manganese oxide.

While $Al_2O_3$ or $Al_2S_3$ improves the thermal stability of the precursor, it exhibits an effect of improving the lithium ion conductivity of the solid electrolyte layer by providing $Al^{3+}$ ions. The minimum content of $Al_2O_3$ or $Al_2S_3$ for obtaining the above-mentioned effects is preferably 5%, specifically 5.5%, more specifically 6%. However, when the content of $Al_2O_3$ or $Al_2S_3$ exceeds 10%, the thermal stability is rather reduced, and the ion conductivity of the solid electrolyte layer is also reduced. Therefore, in the present invention, the maximum content of the $Al_2O_3$ or $Al_2S_3$ component is preferably 10%, specifically, 9.5%, more specifically 9%.

In order to improve the ion conductivity of the above-mentioned solid electrolyte layer, the minimum content of $TiO_2$ or $TiS$ is preferably 35%, specifically 36%, and more particularly 37%. In addition, the maximum content of the $TiO_2$ or $TiS$ component is preferably 45%, specifically 43%, and more specifically 42%.

While $SiO_2$ or $SiS_2$ improves thermal stability, it exhibits the effect of improving the lithium ion conductivity of the solid electrolyte layer by providing $Si^{4+}$ ions. The minimum content of $SiO_2$ or $SiS_2$ for obtaining the above-mentioned effects is preferably 1%, specifically 2%, more specifically 3%. However, when the content of $SiO_2$ or $SiS_2$ exceeds 10%, the ion conductivity of the solid electrolyte layer is rather reduced. Therefore, in the present invention, the maximum content of the $SiO_2$ or $SiS_2$ component is preferably 10%, specifically 8%, more specifically 7%.

$P_2O_5$ or $P_2S_5$ is an essential component as a glass forming agent. When the content of the $P_2O_5$ or $P_2S_5$ component is less than 30%, vitrification hardly occurs. Therefore, the minimum content of the $P_2O_5$ or $P_2S_5$ component is preferably 30%, specifically 32%, and more particularly 33%. When the content of $P_2O_5$ or $P_2S_5$ in the solid electrolyte layer exceeds 40%, the crystal phase is hardly precipitated. Therefore, the maximum content of the $P_2O_5$ or $P_2S_5$ component is preferably 40%, specifically 39%, and more particularly 38%.

The heat treatment may also be performed at 300 to 800 degrees Celsius.

On the other hand, when the solid electrolyte layer further contains a conductive agent, it can be prepared by further mixing the conductive agent particles in step (a) or step (i).

The positive electrode active material thus prepared can be used for a lithium secondary battery, and the lithium secondary battery can be manufactured by impregnating an electrode assembly including a positive electrode, a negative electrode, and a separator with a lithium-containing non-aqueous electrolyte and incorporating it into a battery case.

The positive electrode is manufactured by coating a positive electrode slurry containing the positive electrode active material according to the present invention onto a positive electrode current collector, and then drying and pressing it.

In addition to the positive electrode active material, a conductive material, a binder, a filler, and the like may be optionally contained in the positive electrode slurry.

The conductive material is generally added in an amount of 1 to 30% by weight based on the total weight of the mixture containing the positive electrode active material. The conductive material is not particularly limited as long as it has conductivity without inducing any chemical change in the battery. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as zinc oxide or potassium titanate; conductive metal oxide, such as titanium oxide; or polyphenylene derivatives may be used as the conductive material.

The binder is a component that assists in bonding between the active material and the conductive agent or the like and bonding to the current collector, and is usually added in an amount of 1 to 30% by weight based on the total weight of the mixture containing the positive electrode active material. Examples of these binders include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluoro rubber, and various copolymers.

The filler is an optional component used to inhibit expansion of the electrode. The filler is not particularly limited so long as it does not cause chemical changes in the battery to which it is applied and is made of a fibrous material. As examples of the filler, there may be used olefinic polymers, such as polyethylene and polypropylene; and fibrous materials, such as glass fiber and carbon fiber.

The positive electrode current collector may be generally manufactured to have a thickness of 3 to 500 µm. Such a positive electrode current collector is not particularly limited as long as it has conductivity without inducing any chemical change in the battery. For example, stainless steel, aluminum, nickel, titanium, calcined carbon, or a surface treated material of aluminum or stainless steel with carbon, nickel, titanium, silver, etc. may be used. The current collector may form fine irregularities on its surface to increase the adhesion strength of the positive electrode active material, and it may be used in various shapes such as a film, a sheet, a foil, a net, a porous body, a foam, a non-woven fabric, and the like.

The negative electrode is manufactured, for example, by coating a negative electrode slurry containing a negative electrode active material on a negative electrode current collector, and then drying it, and the negative electrode slurry may contain the components as described above, as necessary.

The negative electrode active material may include at least one carbon-based material selected from the group consisting of artificial crystalline graphite, natural crystalline graphite, amorphous hard carbon, low-crystalline soft carbon, carbon black, acetylene black, Ketjen black, Super-P, graphene and fibrous carbon, Si-based material, $Li_xFe_2O_3$ ($0 \le x \le 1$), $Li_xWO_2 (0 \le x \le 1)$, $Sn_xMe_{1-x}Me'_yO_z$(Me: Mn, Fe, Pb, Ge; Me': Al, B, P, Si, Group 2, Group 3, Group 3 elements, halogen; metal complex oxides such as $0 < x \le 1$; $1 \le y \le 3$; $1 \le z \le 8$); lithium metals; lithium alloys; silicon alloys; Tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; Li-Co-Ni-based materials; titanium oxide; lithium titanium oxide, and the like, but is not limited thereto.

The negative electrode current collector is generally manufactured to have a thickness of 3 to 500 µm. Such negative electrode current collector is not particularly limited as long as it has high conductivity without inducing any chemical change in the battery. For example, copper, stainless steel, aluminum, nickel, titanium, calcined carbon, a surface treated material of copper or stainless steel with carbon, nickel, titanium, silver or the like, an aluminum-cadmium alloy, etc. may be used. Further, similarly to the positive electrode current collector, the negative electrode current collector may form fine irregularities on its surface to increase the adhesion strength of the negative electrode active material, and it can be used in various shapes such as such as a film, a sheet, a foil, a net, a porous body, a foamed body, a non-woven fabric, etc.

The separator is interposed between the positive electrode and the negative electrode, and an insulating thin film having high ion permeability and mechanical strength is used. A pore diameter of the separator is generally 0.01 to 10 µm, and a thickness thereof is generally 5 to 300 µm. For example, there may be used olefin-based polymers such as polypropylene, which is chemically resistant and hydrophobic; a sheet or a non-woven fabric made of glass fiber, polyethylene or the like may be used as an example of the separator. When a solid electrolyte such as a polymer is used as the electrolyte, the solid electrolyte may also serve as a separator.

The lithium salt-containing non-aqueous electrolyte may include a liquid electrolytic solution and a lithium salt, and a non-aqueous organic solvent is used as the liquid electrolytic solution.

As examples of the non-aqueous organic solvent, there may be mentioned non-protic organic solvents, such as N-methyl-2-pyrrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

The lithium salt is a material that is readily soluble in the non-aqueous electrolyte, and may include, for example, LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, chloroborane lithium, lower aliphatic carboxylic acid lithium, lithium tetraphenyl borate, imide, and the like.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the electrolyte. If necessary, in order to impart incombustibility, the electrolyte may further include halogen-containing solvents, such as carbon tetrachloride and ethylene trifluoride. Furthermore, in order to improve high-temperature storage characteristics, the electrolyte may further include carbon dioxide gas, and may further include fluoro-ethylene carbonate(FEC), propene sultone(PRS), etc.

BRIEF DESCRIPTION OF THE DRAWINGS

FIG. 1 is a graph illustrating ionic conductivity versus temperature of various solid electrolytes;

FIG. 2 is a graph illustrating cycle characteristics of the lithium secondary batteries according to Experimental Example 1.

DETAILED DESCRIPTION OF THE EMBODIMENTS

Hereinafter, the present invention will be described in further detail with reference to the following examples. However, the following examples are for illustrative purposes only and are not intended to limit the scope of the present invention.

EXAMPLE 1

The lithium ion conductive glass-ceramic solid electrolyte composed of 30 g of Li$_{1.15}$Ni$_{0.1}$Co$_{0.1}$Mn$_{0.65}$O$_2$ and 0.15 g of Li$_{1.4}$Al$_{0.2}$Ti$_{1.8}$Si$_{0.2}$P$_{2.8}$O$_{12}$ was mixed with ZrO$_2$ by using a ball mill for 1 hour, and the mixture was heat treated in a furnace at 650 degrees Celsius for 5 hours to produce a positive electrode active material of Li$_{1.15}$Ni$_{0.1}$Co$_{0.1}$Mn$_{0.65}$O$_2$ coated with Li$_{1.4}$Al$_{0.2}$Ti$_{1.8}$Si$_{0.2}$P$_{2.8}$O$_{12}$.

EXAMPLE 2

A positive electrode active material was produced in the same manner as in Example 1, except that the lithium ion conductive glass-ceramic solid electrolyte of 0.15 g of Li$_{1.4}$Al$_{0.2}$Ti$_{1.8}$Si$_{0.2}$P$_{2.8}$S$_{12}$ was used instead of 0.15 g of Li$_{1.4}$Al$_{0.2}$Ti$_{1.8}$Si$_{0.2}$P$_{2.8}$O$_{12}$.

EXAMPLE 3

A positive electrode active material was produced in the same manner as in Example 1, except that 0.15 g of a lithium ion conductive glass-ceramic solid electrolyte of Li$_{1.4}$Al$_{0.2}$Ge$_{1.8}$Si$_{0.2}$P$_{2.8}$O$_{12}$ was used instead of 0.15 g of Li$_{1.4}$Al$_{0.2}$Ti$_{1.8}$Si$_{0.2}$P$_{2.8}$O$_{12}$.

EXAMPLE 4

A positive electrode active material was produced in the same manner as in Example 1, except that 0.15 g of a lithium ion conductive glass-ceramic solid electrolyte of Li$_{1.4}$Al$_{0.2}$Ge$_{1.8}$Si$_{0.2}$P$_{2.8}$S$_{12}$ was used instead of 0.15 g of Li$_{1.4}$Al$_{0.2}$Ti$_{1.8}$Si$_{0.2}$P$_{2.8}$O$_{12}$.

EXAMPLE 5

A positive electrode active material was produced in the same manner as in Example 1, except that 0.15 g of a lithium ion conductive glass-ceramic solid electrolyte of Li$_{1.4}$Ga$_{0.2}$Ti$_{1.8}$Si$_{0.2}$P$_{2.8}$O$_{12}$ was used instead of 0.15 g of Li$_{1.4}$Al$_{0.2}$Ti$_{1.8}$Si$_{0.2}$P$_{2.8}$O$_{12}$.

EXAMPLE 6

A positive electrode active material was produced in the same manner as in Example 1, except that 0.15 g of a lithium ion conductive glass-ceramic solid electrolyte of Li$_{1.4}$Ga$_{0.2}$Ti$_{1.8}$Si$_{0.2}$P$_{2.8}$S$_{12}$ was used instead of 0.15 g of Li$_{1.4}$Al$_{0.2}$Ti$_{1.8}$Si$_{0.2}$P$_{2.8}$O$_{12}$.

EXAMPLE 7

A positive electrode active material was produced in the same manner as in Example 1, except that 0.15 g of a lithium ion conductive glass-ceramic solid electrolyte of Li$_{1.4}$Ga$_{0.2}$Ge$_{1.8}$Si$_{0.2}$P$_{2.8}$O$_{12}$ was used instead of 0.15 g of Li$_{1.4}$Al$_{0.2}$Ti$_{1.8}$Si$_{0.2}$P$_{2.8}$O$_{12}$.

EXAMPLE 8

A positive electrode active material was produced in the same manner as in Example 1, except that 0.15 g of a lithium ion conductive glass-ceramic solid electrolyte of Li$_{1.4}$Ga$_{0.2}$Ge$_{1.8}$Si$_{0.2}$P$_{2.8}$S$_{12}$ was used instead of 0.15 g of Li$_{1.4}$Al$_{0.2}$Ti$_{1.8}$Si$_{0.2}$P$_{2.8}$O$_{12}$.

EXAMPLE 9

A positive electrode active material was produced in the same manner as in Example 1, except that 0.15 g of a lithium ion conductive glass-ceramic solid electrolyte of Li$_{1.8}$Al$_{0.4}$Ti$_{1.6}$Si$_{0.4}$P$_{2.6}$O$_{12}$ was used instead of 0.15 g of Li$_{1.4}$Al$_{0.2}$Ti$_{1.8}$Si$_{o0.2}$P$_{2.8}$O$_{12}$.

COMPARATIVE EXAMPLE 1

30 g of Li$_{1.15}$Ni$_{0.1}$Co$_{0.1}$Mn$_{0.65}$O$_2$ not coated with a solid electrolyte was prepared as a positive electrode active material.

COMPARATIVE EXAMPLE 2

A positive electrode active material was produced in the same manner as in Example 1, except that 0.15 g of $Li_3PO_4$—$Li_2S$—$SiS_2$ solid electrolyte was used instead of 0.15 g of $Li_{1.4}Al_{0.2}Ti_{1.8}Si_{0.2}P_{2.8}O_{12}$.

COMPARATIVE EXAMPLE 3

A positive electrode active material was produced in the same manner as in Example 1, except that 0.15 g of $Li_{3.4}V_{0.6}Si_{0.4}O_4$ solid electrolyte was used instead of 0.15 g of $Li_{1.4}Al_{0.2}Ti_{1.8}Si_{0.2}P_{2.8}O_{12}$.

COMPARATIVE EXAMPLE 4

A positive electrode active material was produced in the same manner as in Example 1, except that $Li_{1.15}Ni_{0.2}Co_{0.2}Mn_{0.45}O_2$ was used instead of $Li_{1.15}Ni_{0.1}Co_{0.1}Mn_{0.65}O_2$.

EXPERIMENTAL EXAMPLE 1

The positive electrode active material prepared in each of Examples 1 to 9 and Comparative Examples 1 to 3, a conductive material (Super-P) and a binder (PVdF) were mixed in a weight ratio of 96:2:2, and the mixture was added to NMP as a solvent to prepare a slurry. The slurry was then coated onto an aluminum foil in a thickness of 70 μm, dried and pressed at 130 degrees Celsius to produce a positive electrode.

An artificial graphite as a negative electrode active material, an artificial graphite conductive material (Super-P) and a binder (PVdF) were mixed in a weight ratio of 95:2.5:2.5, and the mixture was added to NMP as a solvent to prepare a negative electrode mixture slurry. The slurry was then coated on a copper foil in a thickness of 70 μm, dried and pressed at 130 degrees Celsius to produce a negative electrode.

Secondary batteries were manufactured by using the positive electrode and the negative electrode, a polyethylene membrane (Celgard, thickness: 20 μm) as a separator, and a liquid electrolyte in which $LiPF_6$ was dissolved at 1 M in a mixed solvent of ethylene carbonate, dimethylene carbonate, and diethyl carbonate in a ratio of 1:2:1.

50 charge/discharge cycles were performed using the secondary batteries manufactured above under a condition of 0.5 C-rate in the range of 2.5 V to 4.6 V, and then the discharge capacity retention after 50 cycles relative to the 1 cycle discharge capacity was calculated, and the results are shown in FIG. 2 below.

Referring to FIG. 2, when using the positive electrode active material according to the present invention, it can be confirmed that the lifetime characteristics are exhibited excellently.

EXPERIMENTAL EXAMPLE 2

The secondary batteries manufactured in Experimental Example 1 were subjected to a rate test in a voltage range of 2.5 V to 4.6 V, and the results are shown in Table 1 below.

TABLE 1

|  | 0.1 C./0.1 C. vs. 0.1 C./0.1 C. | 0.1 C./0.2 C. vs. 0.1 C./0.1 C. | 0.1 C./0.5 C. vs. 0.1 C./0.1 C. | 0.1 C./1 C. vs. 0.1 C./0.1 C. |
|---|---|---|---|---|
| Example 1 | 100% | 94.1% | 81.7% | 50.8% |
| Example 2 | 100% | 94.7% | 83.1% | 53.5% |
| Example 3 | 100% | 94.2% | 81.1% | 50.5% |
| Example 4 | 100% | 94.0% | 81.4% | 51.2% |
| Example 5 | 100% | 93.8% | 79.8% | 50.3% |
| Example 6 | 100% | 84.0% | 80.8% | 53.4% |
| Example 7 | 100% | 93.9% | 79.5% | 49.8% |
| Example 8 | 100% | 94.2% | 80.1% | 51.3% |
| Example 9 | 100% | 95.0% | 81.0% | 52.5% |
| Comparative Example 1 | 100% | 94.0% | 70.3% | 36.7% |
| Comparative Example 2 | 100% | 93.0% | 74.9% | 44.2% |
| Comparative Example 3 | 100% | 93.5% | 75.6% | 45.4% |

Referring to Table 1, it can be confirmed that when the positive electrode active material according to the present invention is used, the rate characteristic is excellently exhibited. Further, referring to Comparative Examples 2 and 3, it can be confirmed that a predetermined improved rate characteristic is exhibited by coating of the solid electrolyte layer, but such an effect is slight, whereas in the case of using the solid electrolyte layer having the composition according to the present invention, a more improved effect is exhibited as compared with the case of using a solid electrolyte layer having another composition.

EXPERIMENTAL EXAMPLE 3

The secondary batteries of Example 1 and Comparative Example 4 were prepared in the same manner as in Experimental Example 1, and the charge capacity and the discharge capacity were measured when the initial cycle progressed under a current condition of 0.1 C-rate in the voltage range of 2.5 V to 4.6 V, and the value calculated by (discharge capacity/charge capacity)×100 was used as 1 cycle charge and discharge efficiency. The results are shown in Table 2 below.

TABLE 2

|  | Charge capacity (mAh/g) | Discharge capacity (mAh/g) |
|---|---|---|
| Example 1 | 316.7 | 253.6 |
| Comparative Example 4 | 258.6 | 204.7 |

Referring to Table 2 above, it can be confirmed that when the content of manganese is 0.5 or less, the capacity of the positive electrode active material having an excessive amount of manganese under a high voltage is very low and thus cannot exhibit a high-capacity characteristic, which is not suitable for the purpose of the present invention.

It will be understood by those skilled in the art that various applications and modifications can be made within the scope of the present invention based on the contents described above.

INDUSTRIAL APPLICABILITY

As described above, in the positive electrode active material of the present invention, by forming a solid electrolyte layer having a specific composition on the surface of lithium-rich lithium manganese-based oxide, it exhibits excellent surface stability even in a high operating voltage range of 4.5 V or more and can increase the ionic conductivity and improve the overall performance of the battery cell.

The invention claimed is:

1. A positive electrode active material comprising:
   lithium-rich lithium manganese-based oxide, in a form of a particle, and
   a lithium ion conductive glass-ceramic solid electrolyte layer formed on a surface of the particle,
   wherein the lithium manganese-based oxide has a composition of the following chemical formula (1), $$Li_{1-x}M_yMn_{1-x-y}O_{2-z}Q_z \quad (1)$$

wherein, $0<x\leq0.2$, $0<y\leq0.2$, and $0\leq z\leq0.5$;
   M is at least one element selected from the group consisting of Al, Mg, Ni, Co, Fe, Cr, V, Ti, Cu, B, Ca, Ga, In, Ru, Zn, Zr, Nb, Sn, Mo, Sr, Sb, W, Ti and Bi; and
   Q is at least one element selected from the group consisting of P, N, F, S and Cl, and
   wherein the lithium ion conductive glass-ceramic solid electrolyte layer comprises LISICON(lithium super ionic conductor), or
   the LISICON and at least one of thio-LISICON(thio-lithium super ionic conductor), $Li_2S$—$SiS_2$—$Li_4SiO_4$, or $Li_2S$—$SiS_2$—$P_2S_5$—LiI, and
   wherein the thio-LISICON is a material represented by $Li_{1+x+y}(Al, Ga)_x(Ti, Ge)_{2-x}Si_yP_{3-y}S_{12}$, wherein, $0\leq x\leq1$, and $0\leq y\leq1$, and the LISICON is a material represented by $Li_{1+x+y}(Al, Ga)_x(Ti, Ge)_{2-x}Si_yP_{3-y}O_{12}$, wherein, $0\leq x\leq1$, and $0\leq y\leq1$.

2. The positive electrode active material according to claim 1, wherein the lithium manganese-based oxide has a composition of the following chemical formula (2)

$$Li_{1+x}Ni_aCo_bMn_{1-x-a-b}O_2 \quad (2)$$

wherein, $0<x\leq0.2$, $0\leq a\leq0.2$, $0\leq b\leq0.2$, and $0<a+b\leq0.2$.

3. The positive electrode active material according to claim 1, wherein an ionic conductivity of the lithium ion conductive glass-ceramic solid electrolyte layer is $1\times10^{-4}$ S·cm$^{-1}$ or more at room temperature.

4. The positive electrode active material according to claim 3, wherein the ionic conductivity of the lithium ion conductive glass-ceramic solid electrolyte layer is $1\times10^{-2}$ S·cm$^{-1}$ to $1\times10^{-3}$ S·cm$^{-1}$ at room temperature.

5. The positive electrode active material according to claim 1, wherein a content of the lithium ion conductive glass-ceramic solid electrolyte layer is 0.1 to 10% by weight, based on a total weight of the lithium manganese-based oxide.

6. The positive electrode active material according to claim 1, wherein the lithium ion conductive glass-ceramic solid electrolyte layer further includes a conductive agent.

7. A positive electrode comprising a positive electrode mixture comprising the positive electrode active material according to claim 1 formed on at least one side of a current collector.

8. A secondary battery comprising the positive electrode according to claim 7.

9. A method for producing a positive electrode active material of claim 1 comprising:
   (a) mixing a lithium-rich lithium manganese-based oxide powder and a lithium ion conductive glass-ceramic solid electrolyte powder containing thio-LISICON (thio-lithium super ionic conductor), LISICON(lithium super ionic conductor), $Li_2S$—$SiS_2$—$Li_4SiO_4$, or $Li_2S$—$SiS_2$—$P_2S_5$—LiI, to form a mixture; and
   (b) heat-treating the mixture, and
   the thio-LISICON is a material represented by $Li_{1+x+y}(Al, Ga)_x(Ti, Ge)_{2-x}Si_yP_{3-y}S_{12}$, wherein, $0\leq x\leq1$, and $0\leq y\leq1$, and the LISICON is a material represented by $Li_{1+x+y}(Al, Ga)_x(Ti, Ge)_{2-x}Si_yP_{3-y}O_{12}$, wherein, $0\leq x\leq1$, and $0\leq y\leq1$,
   wherein the heat treating is performed at 300 to 800 degrees Celsius.

10. The method for producing a positive electrode active material according to claim 9, wherein a mixing ratio of the lithium-rich lithium manganese-based oxide powder and the lithium ion conductive glass-ceramics solid electrolyte powder is 0.1 to 10% by weight based on a total weight of the lithium-rich lithium manganese-based oxide powder.

11. A method for producing a positive electrode active material according to claim 1 comprising:
    (i) mixing a lithium-rich lithium manganese-based oxide powder and a solid electrolyte precursor to form a mixture; and
    (ii) heat-treating the mixture,
    wherein the solid electrolyte precursor is an inorganic material including $Li_2O$, $Al_2O_3$, $Ga_2O$, $Ga_2O_3$, $SiO_2$, $P_2O_5$, $TiO_2$, $GeO_2$, $Li_2S$, $Al_2S_3$, $GaS$ or $Ga_2S_3$, $SiS_2$, $P_2S_5$, $TiS$ or $GeS_2$.

12. The method for producing a positive electrode active material according to claim 11, wherein a lithium compound is present on a surface of the lithium-rich lithium manganese-based oxide powder.

13. The method for producing a positive electrode active material according to claim 12, wherein the lithium compound is at least one selected from the group consisting of LiOH, $Li_2CO_3$, and $Li_3PO_4$.

14. The method for producing a positive electrode active material according to claim 11, wherein the heat treating is performed at 300 to 800 degrees Celsius.

15. A positive electrode active material comprising:
    lithium-rich lithium manganese-based oxide, in a form of a particle, and
    a lithium ion conductive glass-ceramic solid electrolyte layer formed on a surface of the particle,
    wherein the lithium manganese-based oxide has a composition of the following chemical formula (1), $$Li_{1-x}M_yMn_{1-x-y}O_{2-z}Q_z \quad (1)$$

wherein, $0<x\leq0.2$, $0<y\leq0.2$, and $0\leq z\leq0.5$;
    M is at least one element selected from the group consisting of Al, Mg, Ni, Co, Fe, Cr, V, Ti, Cu, B, Ca, Ga, In, Ru, Zn, Zr, Nb, Sn, Mo, Sr, Sb, W, Ti and Bi; and
    Q is at least one element selected from the group consisting of P, N, F, S and Cl, and
    wherein the lithium ion conductive glass-ceramic solid electrolyte layer comprises thio-LISICON(thio-lithium super ionic conductor), or
    the thio-LISICON and at least one of LISICON(lithium super ionic conductor), $Li_2S$—$SiS_2$—$Li_4SiO_4$, or $Li_2S$—$SiS_2$—$P_2S_5$—LiI, and
    wherein the thio-LISICON is a material represented by $Li_{1+x+y}(Al, Ga)_x(Ti, Ge)_{2-x}Si_yP_{3-y}S_{12}$, wherein, $0\leq x\leq1$, and $0\leq y\leq1$, and the LISICON is a material represented by $Li_{1+x+y}(Al, Ga)_x(Ti, Ge)_{2-x}Si_yP_{3-y}O_{12}$, wherein, $0\leq x\leq1$, and $0\leq y\leq1$.

* * * * *